(12) United States Patent
Kim et al.

(10) Patent No.: US 12,057,124 B2
(45) Date of Patent: Aug. 6, 2024

(54) REDUCING STREAMING ASR MODEL DELAY WITH SELF ALIGNMENT

(71) Applicant: Google LLC, Mountain View, CA (US)

(72) Inventors: Jaeyoung Kim, Mountain View, CA (US); Han Lu, Santa Clara, CA (US); Anshuman Tripathi, Mountain View, CA (US); Qian Zhang, Mountain View, CA (US); Hasim Sak, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 365 days.

(21) Appl. No.: 17/644,377

(22) Filed: Dec. 15, 2021

(65) Prior Publication Data
US 2022/0310097 A1    Sep. 29, 2022

Related U.S. Application Data

(60) Provisional application No. 63/166,943, filed on Mar. 26, 2021.

(51) Int. Cl.
*G10L 15/26* (2006.01)
*G10L 15/16* (2006.01)

(52) U.S. Cl.
CPC .............. *G10L 15/26* (2013.01); *G10L 15/16* (2013.01)

(58) Field of Classification Search
CPC ................................ G10L 15/26; G10L 15/16
See application file for complete search history.

(56) References Cited

U.S. PATENT DOCUMENTS

2010/0161329 A1* 6/2010 Chung .................... G10L 15/08
                                                            704/E15.001
2018/0114525 A1* 4/2018 Tyagi .................... G10L 15/063

OTHER PUBLICATIONS

Qian Zhang, Han Lu, Hasim Sak, Anshuman Tripathi, Erik McDermott, Stephen Koo, Shankar Kumar, "Transformer Transducer: A Streamable Speech Recognition Model with Transformer Encoders and RNN-T Loss", Feb. 14, 2020, arXiv:2002.02562v2 (Year: 2020).*

(Continued)

*Primary Examiner* — Pierre Louis Desir
*Assistant Examiner* — Daniel W Chung
(74) *Attorney, Agent, or Firm* — Honigman LLP; Brett A. Krueger; Grant Griffith

(57) ABSTRACT

A streaming speech recognition model includes an audio encoder configured to receive a sequence of acoustic frames and generate a higher order feature representation for a corresponding acoustic frame in the sequence of acoustic frames. The streaming speech recognition model also includes a label encoder configured to receive a sequence of non-blank symbols output by a final softmax layer and generate a dense representation. The streaming speech recognition model also includes a joint network configured to receive the higher order feature representation generated by the audio encoder and the dense representation generated by the label encoder and generate a probability distribution over possible speech recognition hypotheses. Here, the streaming speech recognition model is trained using self-alignment to reduce prediction delay by encouraging an alignment path that is one frame left from a reference forced-alignment frame.

20 Claims, 6 Drawing Sheets

(56) References Cited

OTHER PUBLICATIONS

Ching-Feng Yeh, Jay Mahadeokar, Kaustubh Kalgaonkar, Yongqiang Wang, Duc Le, Mahaveer Jain, Kjell Schubert, Christian Fuegen, Michael L. Seltzer, "Transformer-Transducer: End-to-End Speech Recognition with Self-Attention", Oct. 28, 2019, arXiv: 1910.12977v1 (Year: 2019).*

Xiaolong Deng, Yingfei Sun, "An Improved Embedding Matching Model for Chinese Word Segmentation", 2018 International Conference on Artificial Intelligence and Big Data (ICAIBD), Chengdu, China, 2018, pp. 195-200, doi: 10.1109/ICAIBD.2018.8396193. (Year: 2018).*

Matthew Kelly, Benjamin Tucker, "A comparison of input types to a deep neural network-based forced aligner", Sep. 2018, 1205-1209. 10.21437/Interspeech.2018-1115. (Year: 2018).*

Mar. 28, 2022 Written Opinion (WO) of the International Searching Authority (ISA) and International Search Report (ISR) issued in International Application No. PCT/US2021/063465.

Anshuman Tripathi et al: "Transformer Transducer: One Model Unifying Streaming and Non-streaming Speech Recognition", arxiv.org, Cornell University Library, 201 Olin Library Cornell University Ithaca, NY 14853, Oct. 7, 2020 (Oct. 7, 2020), XP081780506.

Zhang Qian et al: "Transformer Transducer: A Streamable Speech Recognition Model with Transformer Encoders and RNN-T Loss", ICASSP 2020—2020 IEEE International Conference on Acoustics, Speech and Signal Processing (ICASSP), IEEE, May 4, 2020 (May 4, 2020), pp. 7829-7833, XP033793545.

Jaeyoung Kim et al: "Reducing Streaming ASR Model Delay with Self Alignment", arxiv.org, Cornell University Library, 201 Olin Library Cornell University Ithaca, NY 14853, May 6, 2021 (May 6, 2021), XP081961904.

* cited by examiner

REDUCING STREAMING ASR MODEL DELAY WITH SELF ALIGNMENT

CROSS REFERENCE TO RELATED APPLICATIONS

This U.S. patent application claims priority under 35 U.S.C. § 119(e) to U.S. Provisional Application 63/166,943, filed on Mar. 26, 2021. The disclosure of this prior application is considered part of the disclosure of this application and is hereby incorporated by reference in its entirety.

TECHNICAL FIELD

This disclosure relates to using a reducing streaming automatic speech recognition (ASR) model delay with self-alignment.

BACKGROUND

Automatic speech recognition (ASR), the process of taking an audio input and transcribing it into text, has greatly been an important technology that is used in mobile devices and other devices. In general, ASR attempts to provide accurate transcriptions of what a person has said by taking an audio input (e.g., speech utterance) and transcribing the audio input into text. Modern ASR models continue to improve in both accuracy (e.g. a low word error rate (WER)) and latency (e.g., delay between the user speaking and the transcription) based on the ongoing development of deep neural networks. When using an ASR system today there is a demand that the ASR system decodes utterances in a streaming fashion that corresponds to real-time or even faster than real-time, but is also accurate. However, streaming end-to-end models which optimize sequence likelihoods without any delay constrains suffer from high delay between the audio input and the predicted text because these models learn to improve their prediction by using more future context.

SUMMARY

One aspect of the disclosure provides a streaming speech recognition model that includes an audio encoder configured to receive, as input, a sequence of acoustic frames and generate, at each of a plurality of time steps, a higher order feature representation for a corresponding acoustic frame in the sequence of acoustic frames. The streaming speech recognition model also includes a label encoder configured to receive, as input, a sequence of non-blank symbols output by a final softmax layer and generate, at each of the plurality of time steps, a dense representation. The streaming speech recognition model also includes a joint network configured to: receive, as input, the higher order feature representation generated by the audio encoder at each of the plurality of time steps and the dense representation generated by the label encoder at each of the plurality of time steps; and generate, at each of the plurality of time steps, a probability distribution over possible speech recognition hypotheses at the corresponding time step. Here, the streaming speech recognition model is trained using self-alignment to reduce prediction delay by encouraging, for each training batch, an alignment path that is one frame left of a reference forced-alignment frame at each time step.

Implementations of the disclosure may include one or more of the following optional features. In some implementations, the streaming speech recognition model includes a Transformer-Transducer model. In these implementations, the audio encoder may include a stack of transformer layers where each transformer layer includes a normalization layer, a masked multi-head attention layer with relative position encoding, residual connections, a stacking/unstacking layer, and a feedforward layer. Here, the stacking/unstacking layer may be configured to change a frame rate of the corresponding transformer layer to adjust processing time by the Transformer-Transducer model during training and inference. In some examples, the label encoder includes a stack of transformer layers where each transformer layer includes a normalization layer, a masked multi-head attention layer with relative position encoding, residual connections, a stacking/unstacking layer, and a feedforward layer.

Optionally, the label encoder may include a bigram embedding lookup decoder model. In some examples, the streaming speech recognition model includes one of a recurrent neural-transducer (RNN-T) model, a Transformer-Transducer model, a Convolutional Network-Transducer (ConvNet-Transducer) model, or a Conformer-Transducer model. Training the streaming speech recognition model using self-alignment to reduce prediction delay may include using self-alignment without using any external aligner model to constrain alignment of the decoding graph. In some implementations, the streaming speech recognition model executes on a user device or a server. In some examples, each acoustic frame in the sequence of acoustic frames includes a dimensional feature vector.

Another aspect of the disclosure provides a computer-implemented method that when executed on data processing hardware causes the data processing hardware to perform operations for training a streaming speech recognition model using self-alignment to reduce prediction delay. The operations include receiving, as input to the streaming speech recognition model, a sequence of acoustic frames that correspond to an utterance. The streaming speech recognition model is configured to learn an alignment probability between the sequence of acoustic frames and an output sequence of label tokens. The operations also include generating, as output from the streaming speech recognition model, a speech recognition result for the utterance. The speech recognition results includes an output sequence of label tokens using a decoding graph. The operations also include generating a speech recognition model loss based on the speech recognition result and a ground-truth transcription of the utterance. The operations also include obtaining, from the decoding graph, a reference-forced alignment path that includes reference forced-alignment frames and identifying, from the decoding graph, one frame to the left from each reference forced-alignment frame in the reference-forced alignment path. The operations also include summing label transition probabilities based on the identified frames to the left from each forced-alignment frame in the reference-forced alignment path and updating the streaming speech recognition model based on the summing of the label transition probabilities and the speech recognition model loss.

Implementations of the disclosure may include one or more of the following optional features. In some implementations, the operations further comprise: generating, by an audio encoder of the streaming speech recognition model, a higher order feature representation for a corresponding acoustic frame in the sequence of acoustic frames at each of a plurality of time steps; receiving, as input to a label encoder of the streaming speech recognition model, a sequence of non-blank symbols output by a final softmax layer; generating, by the label encoder, a dense representation at each of the plurality of time steps; receiving, as input to a joint network of the streaming speech recognition model, the higher order feature representation generated by the audio encoder at each of the plurality of times steps and the dense representation generated by the label encoder at each of the plurality of time steps; and generating, by the joint network, at each of the plurality of time steps, a probability distribution over possible speech recognition hypotheses at the corresponding time step. In some examples, the label encoder includes a stack of transformer layers where each transformer layer includes a normalization layer, a masked multi-head attention layer with relative position encoding, residual connections, a stacking/unstacking layer, and a feedforward layer. The label encoder may include a bigram embedding lookup decoder model.

In some implementations, the streaming speech recognition model includes a Transformer-Transducer model. The audio encoder may include a stack of transformer layers where each transformer layer includes a normalization layer, a masked multi-head attention layer with relative position encoding, residual connections, a stacking/unstacking layer, and a feedforward layer. Here, the stacking/unstacking layer may be configured to change a frame rate of the corresponding transformer layer to adjust processing time by the Transformer-Transducer model during training and inference.

In some implementations, the streaming speech recognition model includes one of a recurrent neural-transducer (RNN-T) model, a Transformer-Transducer model, a Convolutional Network-Transducer (ConvNet-Transducer) model, or a Conformer-Transducer model. The streaming speech recognition model may execute on a user device or a server. In some examples, the operations further include training the streaming speech recognition model using self-alignment to reduce prediction delay without using any external aligner model to constrain alignment of the decoding graph.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
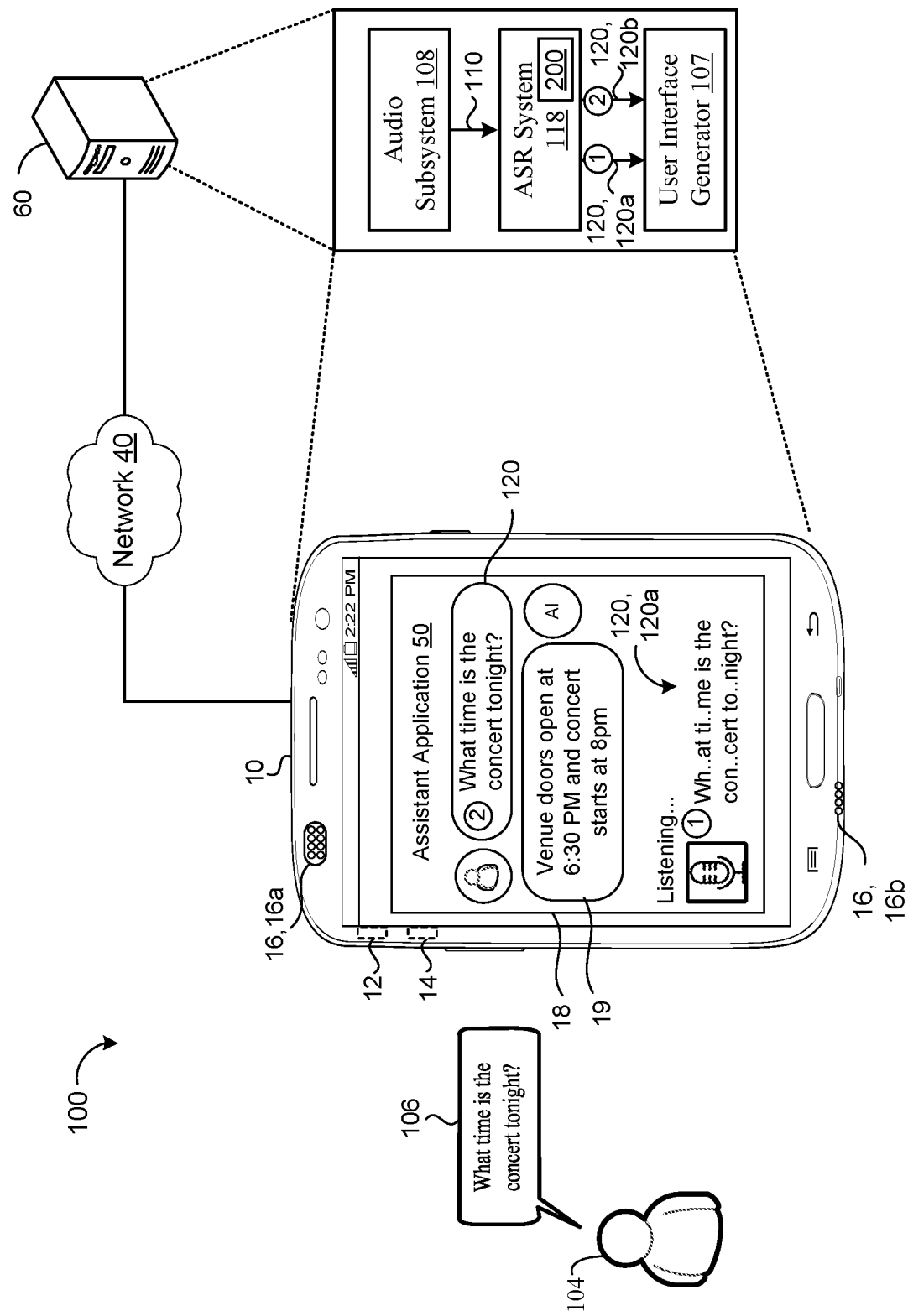
FIG. 1 is a schematic view of a speech environment implementing a transducer model to perform streaming speech recognition.

Automatic speech recognition (ASR) systems focus on providing not only quality/accuracy (e.g., low word error rates (WERs)), but also low latency (e.g., a short delay between the user speaking and a transcription appearing). Recently, end-to-end (E2E) ASR models have gained popularity in achieving state-of-the-art performance in accuracy and latency. In contrast to conventional hybrid ASR systems that include separate acoustic, pronunciation, and language models, E2E models apply a sequence-to-sequence approach to jointly learn acoustic and language modeling in a single neural network that is trained end to end from training data, e.g., utterance-transcription pairs. Here, an E2E model refers to a model whose architecture is constructed entirely of a neural network. A full neural network functions without external and/or manually designed components (e.g., finite state transducers, a lexicon, or text normalization modules). Additionally, when training E2E models, these models generally do not require bootstrapping from decision trees or time alignments from a separate system.

When using an ASR system today there may be a demand for the ASR system to decode utterances in a streaming fashion that corresponds to displaying a description of an utterance in real time, or even faster than real-time, as a user speaks. To illustrate, when an ASR system is displayed on a user computing device, e.g., such as a mobile phone, that experiences direct user interactivity, an application (e.g., a digital assistant application), executing on the user device and using the ASR system, may require the speech recognition to be streaming such that words, word pieces, and/or individual characters appear on the screen as soon as they are spoken. Additionally, it is also likely that the user of the user device has a low tolerance for latency. For instance, when the user speaks a query requesting the digital assistant to retrieve details from a calendar application for an upcoming appointment, the user would like the digital assistant to provide a response conveying the retrieved details as quickly as possible. Due to this low tolerance, the ASR system strives to run on the user device in a manner that minimizes an impact from latency and inaccuracy that may detrimentally affect the user's experience.

One form of a sequence-to-sequence model known as a recurrent neural network-transducer (RNN-T) does not employ an attention mechanism and, unlike other sequence-to-sequence models that generally need to process an entire sequence (e.g., audio waveform) to produce an output (e.g., a sentence), the RNN-T continuously processes input samples and streams output symbols, a feature that is particularly attractive for real-time communication. For instance, speech recognition with an RNN-T may output characters one-by-one as spoken. Here, an RNN-T uses a feedback loop that feeds symbols predicted by the model back into itself to predict the next symbols. Because decoding the RNN-T includes a beam search through a single neural network instead of a large decoder graph, an RNN-T may scale to a fraction of the size of a server-based speech recognition model. With the size reduction, the RNN-T may be deployed entirely on-device and be able to run offline (i.e., without a network connection), therefore, avoiding unreliability issues with communication networks. While suitable for providing streaming transcription capabilities, as well as latency-sensitive applications, that generally recognize conversational queries (e.g., set a timer", "remind me to buy the milk", etc.), RNN-T models leveraging Long Short-Term Memory (LSTM) to provide a sequence encoder have limited ability to look ahead audio context, and thereby still lag behind large state-of-the-art convention models (e.g., a server-based model with separate AM, PM, and LMs)) and attention-based sequence-to-sequence models (e.g., Listen- Attend-Spell (LAS)) in terms of quality (e.g., speech recognition accuracy as often measured by word error rate (WER)).

Recently, Transformer-Transducer (T-T) and Conformer-Transducer (C-T) model architectures have been introduced to further improve the RNN-T model architecture by replacing LSTM layers at the audio encoder and/or prediction network with respective ones of Transformer or Conformer layers. Generally, T-T and C-T model architectures are capable of accessing future audio frames (e.g., right context) when computing self-attention in their respective Transformer or Conformer layers. Thus, T-T and C-T model architectures may leverage future right context to operate in a non-streaming transcription mode to improve speech recognition performance when latency-constraints are relaxed. That is, there is a duration of prediction delay proportional to the amount of future audio frames being accessed. However, like RNN-T, the T-T and C-T model architectures may also operate in streaming transcription modes where the self-attention only depends on past acoustic frames (e.g., left context).

Streaming speech recognition models, such as transducer models (e.g., RNN-T, T-T, and C-T), optimize sequence likelihoods without any delay constraints, and therefore suffer from high delay between the audio input and the predicted text because these models learn to improve their prediction by using more future context. Recent approaches to reducing prediction delay include constrained alignment techniques that penalize word boundaries based on audio alignment information obtained from an external alignment model by masking out alignment paths exceeding a predetermined threshold delay. While this technique is effective at reducing latency of streaming end-to-end models, a high-precision external alignment model is required to minimize WER degradation, which can further complicate model training steps. Other techniques which blindly reduce delay by choosing a most efficient direction in an RNN-T decoding graph, often choose a direction that is not optimal for all audio input due to lack of alignment information, which may further degrade delay-WER trade-offs.

To alleviate the drawbacks associated with using external alignment models or simply blindly reducing delay by choosing a most efficient direction from decoding graphs, implementations herein are directed toward reducing prediction delay in streaming speech recognition models by using self-alignment. Notably, self-alignment does not require the use of any external alignment models or blindly optimize delay, but instead leverages reference forced-alignments learned from the trained speech recognition model to choose an optimal low latency direction that reduces delay. The reference forced-alignments may include Viterbi forced-alignments. That is, self-alignment will always locate the path in the decoding graph that is one frame left to the Viterbi forced-alignment at each time step. Self-alignment has advantages over existing schemes for constraining delay. First, training complexity for self-alignment is much lower than teacher-assisted schemes since self-alignment does not need external alignment models. Second, self-alignment minimally affects ASR training by only constraining the most probable alignment path. On the contrary, other schemes affect many alignment paths by masking out them or changing weights on their label transition probabilities. Since delay constraining regularization terms always conflict with the main ASR loss, minimal intervention on the main loss would be important to optimizing delay and performance trade-offs. Self-alignment only regularizes single path by pushing it to its left direction.

FIG. 1 is an example of a speech environment 100. In the speech environment 100, a user's 104 manner of interacting with a computing device, such as a user device 10, may be through voice input. The user device 10 (also referred to generally as a device 10) is configured to capture sounds (e.g., streaming audio data) from one or more users 104 within the speech environment 100. Here, the streaming audio data may refer to a spoken utterance 106 by the user 104 that functions as an audible query, a command for the device 10, or an audible communication captured by the device 10. Speech-enabled systems of the device 10 may field the query or the command by answering the query and/or causing the command to be performed/fulfilled by one or more downstream applications.

The user device 10 may correspond to any computing device associated with a user 104 and capable of receiving audio data. Some examples of user devices 10 include, but are not limited to, mobile devices (e.g., mobile phones, tablets, laptops, etc.), computers, wearable devices (e.g., smart watches), smart appliances, internet of things (IoT) devices, vehicle infotainment systems, smart displays, smart speakers, etc. The user device 10 includes data processing hardware 12 and memory hardware 14 in communication with the data processing hardware 12 and stores instructions, that when executed by the data processing hardware 12, cause the data processing hardware 12 to perform one or more operations. The user device 10 further includes an audio system 16 with an audio capture device (e.g., microphone) 16, 16a for capturing and converting spoken utterances 106 within the speech environment 100 into electrical signals and a speech output device (e.g., a speaker) 16, 16b for communicating an audible audio signal (e.g., as output audio data from the device 10). While the user device 10 implements a single audio capture device 16a in the example shown, the user device 10 may implement an array of audio capture devices 16a without departing from the scope of the present disclosure, whereby one or more capture devices 16a in the array may not physically reside on the user device 10, but be in communication with the audio system 16.

In the speech environment 100, an automated speech recognition (ASR) system 118 a transducer model 200 resides on the user device 10 of the user 104 and/or on a remote computing device 60 (e.g., one or more remote servers of a distributed system executing in a cloud-computing environment) in communication with the user device 10 via a network 40. The user device 10 and/or the remote computing device 60 also includes an audio subsystem 108 configured to receive the utterance 106 spoken by the user 104 and captured by the audio capture device 16a, and convert the utterance 106 into a corresponding digital format associated with input acoustic frames 110 capable of being processed by the ASR system 118. In the example shown, the user speaks a respective utterance 106 and the audio subsystem 108 converts the utterance 106 into corresponding audio data (e.g., acoustic frames) 110 for input to the ASR system 118. Thereafter, the transducer model 200 receives, as input, the audio data 110 corresponding to the utterance 106, and generates/predicts, as output, a corresponding transcription 120 (e.g., recognition result/hypothesis) of the utterance 106. The transducer model 200 provides a streaming speech recognition result that does not have access to lookahead audio and therefore provides streaming transcription capabilities in real-time as the user 104 is speaking the utterance 106. For instance, a digital assistant application 50 executing on the user device 10 may require the speech recognition to be streaming such that words, word pieces, and/or individual characters appear on the screen as soon as they are spoken.

The user device 10 and/or the remote computing device 60 also executes a user interface generator 107 configured to present a representation of the transcription 120 of the utterance 106 to the user 104 of the user device 10. As described in greater detail below, the user interface generator 107 may display the partial speech recognition results 120a in a streaming fashion during time 1 and subsequently display the final speech recognition result 120b during time 2. In some configurations, the transcription 120 output from the ASR system 118 is processed, e.g., by a natural language understanding (NLU) module executing on the user device 10 or the remote computing device 60, to execute a user command/query specified by the utterance 106. Additionally or alternatively, a text-to-speech system (not shown) (e.g., executing on any combination of the user device 10 or the remote computing device 60) may convert the transcription into synthesized speech for audible output by the user device 10 and/or another device.

In the example shown, the user 104 interacts with a program or application 50 (e.g., the digital assistant application 50) of the user device 10 that uses the ASR system 118. For instance, FIG. 1 depicts the user 104 communicating with the digital assistant application 50 and the digital assistant application 50 displaying a digital assistant interface 18 on a screen of the user device 10 to depict a conversation between the user 10 and the digital assistant application 50. In this example, the user 104 asks the digital assistant application 50, "What time is the concert tonight?" This question from the user 104 is a spoken utterance 106 captured by the audio capture device 16a and processed by audio systems 16 of the user device 10. In this example, the audio system 16 receives the spoken utterance 106 and converts it into acoustic frames 110 for input to the ASR system 118.

Continuing with the example, the transducer model 200, while receiving the acoustic frames 110 corresponding to the utterance 106 as the user 104 speaks, encodes the acoustic frames 110 and then decodes the encoded acoustic frames 110 into the partial speech recognition results 120a. During time 1, the user interface generator 107 presents, via the digital assistant interface 18, a representation of the partial speech recognition results 120a of the utterance 106 to the user 104 of the user device 10 in a streaming fashion such that words, word pieces, and/or individual characters appear on the screen as soon as they are spoken. In some examples, the first look ahead audio context is equal to zero.

During time 2, the user interface generator 107 presents, via the digital assistant interface 18, a representation of a final speech recognition result 120b of the utterance 106 to the user 104 of the user device 10. The final speech recognition result 120b may simply be the partial speech recognition results 120a once the user finishes speaking. Optionally, the ASR system 118 may include another speech recognition to rescore the partial speech recognition results and/or use an external language model. Optionally, the same transducer model 200 may process the audio again once the user is finished speaking but instead leverage right look ahead audio context to generate the final speech recognition result 120b. This disclosure is not concerned with how the final speech recognition result 120b is obtained, and instead, focuses on limiting delay in the streaming partial speech recognition results 120a output by the transducer model 200.

In the example shown in FIG. 1, the digital assistant application 50 may respond to the question posed by the user 10 using natural language processing. Natural language processing generally refers to a process of interpreting written language (e.g., the partial speech recognition results 120a and/or the final speech recognition result 120b) and determining whether the written language prompts any action. In this example, the digital assistant application 50 uses natural language processing to recognize that the question from the user 10 regards the user's schedule and more particularly a concert on the user's schedule. By recognizing these details with natural language processing, the automated assistant returns a response 19 to the user's query where the response 19 states, "Venue doors open at 6:30 PM and concert starts at 8 pm." In some configurations, natural language processing occurs on a remote server 60 in communication with the data processing hardware 12 of the user device 10.

Figure 2:
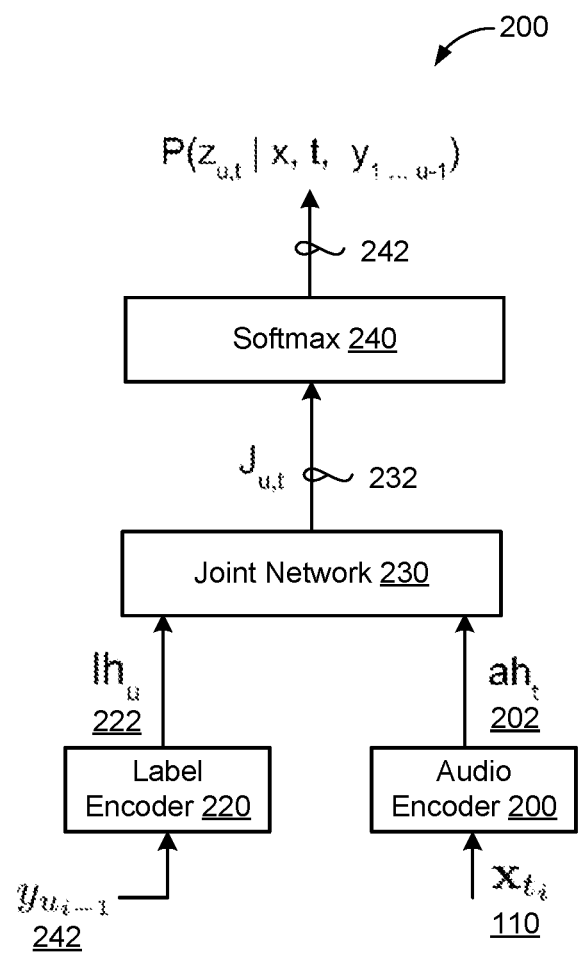
FIG. 2 is a schematic view of an example transducer model architecture.

With reference to FIG. 2, the transducer model 200 may provide an end-to-end (E2E) speech recognition by integrating acoustic, pronunciation, and language models into a single neural network, and does not require a lexicon or a separate text normalization component. Various structures and optimization mechanisms can provide increased accuracy and reduced model training time. In the example shown, the transducer model 200 includes a Transformer-Transducer (T-T) model architecture, which adheres to latency constraints associated with interactive applications. The T-T model 200 provides a small computational footprint and utilizes less memory requirements than conventional ASR architectures, making the T-T model architecture suitable for performing speech recognition entirely on the user device 10 (e.g., no communication with a remote server 60 is required). The T-T model 200 includes an audio encoder 210, a label encoder 220, and a joint network 230. The audio encoder 210, which is roughly analogous to an acoustic model (AM) in a traditional ASR system, includes a neural network having a plurality of transformer layers. For instance, the audio encoder 210 reads a sequence of d-dimensional feature vectors (e.g., acoustic frames 110 (FIG. 1)) $x=(x_1, x_2, \ldots, x_T)$, where $x_t \in \mathbb{R}_d$, and produces at each time step a higher-order feature representation 202. This higher-order feature representation 202 is denoted as $ah_1, \ldots, ah_T$. An example Transformer-Transducer model architecture is described in U.S. application Ser. No. 17/210,465, filed on Mar. 23, 2021, the contents of which are incorporated by reference in their entirety.

Similarly, the label encoder 220 may also include a neural network of transformer layers or a look-up table embedding model, which, like a language model (LM), processes the sequence of non-blank symbols 242 output by a final Softmax layer 240 so far, $y_0, \ldots, y_{ui-1}$, into a dense representation 222 (e.g., denoted as $lh_{ui}$) that encodes predicted label history. In implementations when the label encoder 220 includes the neural network of transformer layers, each transformer layer may include a normalization layer, a masked multi-head attention layer with relative position encoding, a residual connection, a feed forward layer, and a dropout layer. In these implementations, the label encoder 220 may include two transformer layers. In implementations when the label encoder 220 includes the look-up table embedding model with a bi-gram label context, the embedding model is configured to learn a weight vector of the d-dimension for each possible bigram label context, where d is the dimension of the outputs of the audio and label encoders 210, 220. In some examples, the total number of parameters in the embedding model is $N^2 \times d$ where N is the vocabulary size for the labels. Here, the learned weight vector is then used as the embedding of the bigram label context in the T-T model 200 to produce fast label encoder 220 runtimes.

Finally, with the T-T model architecture, the representations produced by the audio and label encoders 210, 220 are combined by the joint network 230 using a dense layer Jo. The joint network 230 then predicts an alignment distribution (e.g., alignment probability 232) over the next output symbol as follows.

$$Pr(z_{u,t}|x,t,y_1,\ldots y_{u-1}) \quad (1)$$

where x is audio input, y is a ground-truth label sequence, and z is an alignment belonging to y. Stated differently, the joint network 230 generates, at each output step (e.g., time step), a probability distribution 232 over possible speech recognition hypotheses. Here, the "possible speech recognition hypotheses" correspond to a set of output labels (also referred to as "speech units") each representing a grapheme (e.g., symbol/character) or a word piece in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector (e.g., a one-hot vector) and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 230 can include a posterior probability value for each of the different output labels. Thus, if there are 100 different output labels representing different graphemes or other symbols, the output $z_{u,t}$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription 120.

The Softmax layer 240 may employ any technique to select the output label/symbol with the highest probability in the distribution as the next output symbol 242 predicted by the T-T model 200 at the corresponding output step. As such, the collection of output symbols 242 predicted by the T-T model 200 may also be referred to collectively as an output sequence of label tokens 242. In this manner, the T-T model 200 does not make a conditional independence assumption, rather the prediction of each symbol is conditioned not only on the acoustics but also on the sequence of labels output so far.

To determine a log conditional probability of y given audio input x, all alignment distributions corresponding to y are summed as follows.

$$\log Pr(y \mid x) = \log \sum_{K(z) \in y} Pr(y \mid x) \quad (2)$$

where the mapping K removes blank symbols in z. This log total alignment probability of Eq. 2 includes a target loss function which may be efficiently computed using a forward-backward algorithm as follows.

$$Pr(y|x)=\alpha(T,U) \quad (3)$$

$$\alpha(t,u)=\alpha(t-1,u-1)Pr(\phi|t-1,u)+\alpha(t,u-1)Pr(y_u|t,u-1) \quad (4)$$

where $Pr(\phi|t-1, u)$ and $Pr(y_u|t, u-1)$ are blank and label probabilities, respectively, and T and U are audio and label sequence lengths.

While FIG. 2 depicts the transducer model 200 including the T-T model architecture, the transducer model 200 may also include a RNN-T model architecture, a Convolutional Neural Network-Transducer (CNN-Transducer) model architecture, a Convolutional Network-Transducer (ConvNet-Transducer) model, or a Conformer-Transducer model architecture without departing from the scope of the present disclosure. An example CNN-Transducer model architecture is described in detail in "Contextnet: Improving Convolutional Neural Networks for Automatic Speech Recognition with Global Context," https://arxiv.org/abs/2005.03191, the contents of which are incorporated by reference in their entirety. An example Conformer-Transducer model architecture is described in detail in "Conformer: Convolution-augmented transformer for speech recognition," https://arxiv.org/abs/2005.08100, the contents of which are incorporated by reference in their entirety.

The transducer model 200 is trained on a training data set of audio data corresponding to spoken utterances paired with corresponding transcriptions. Training the transducer model 200 may occur on the remote server 60 and the trained transducer model 200 may be pushed to the user device 10. The transducer model 200 is trained with cross-entropy loss based on Viterbi forced-alignments. An alignment delay includes a delay between input audio frames and streamed decoded output labels. Since conventional models iteratively trains aligning models with realigned labels, convention models can learn accurate alignments after multiple iterations. A T-T or C-T model accessing future frames when computing self-attention at the respective Transformer or Conformer layers may include an alignment delay that coincides with conventional models. However, transducer models in streaming modes whose self-attention only depends on past frames experience excessive alignment delays.

Implementations herein are directed toward reducing prediction delay in the streaming transducer model 200 by using self-alignment. Notably, self-alignment does not require the use of any external alignment models or blindly optimize delay, but instead leverages reference forced-alignments learned from the trained speech recognition model to choose an optimal low latency direction that reduces delay. The reference forced-alignments may include Viterbi forced-alignments. That is, self-alignment will always locate the path in the decoding graph that is one frame left to the Viterbi forced-alignment at each time step.

Figure 3:
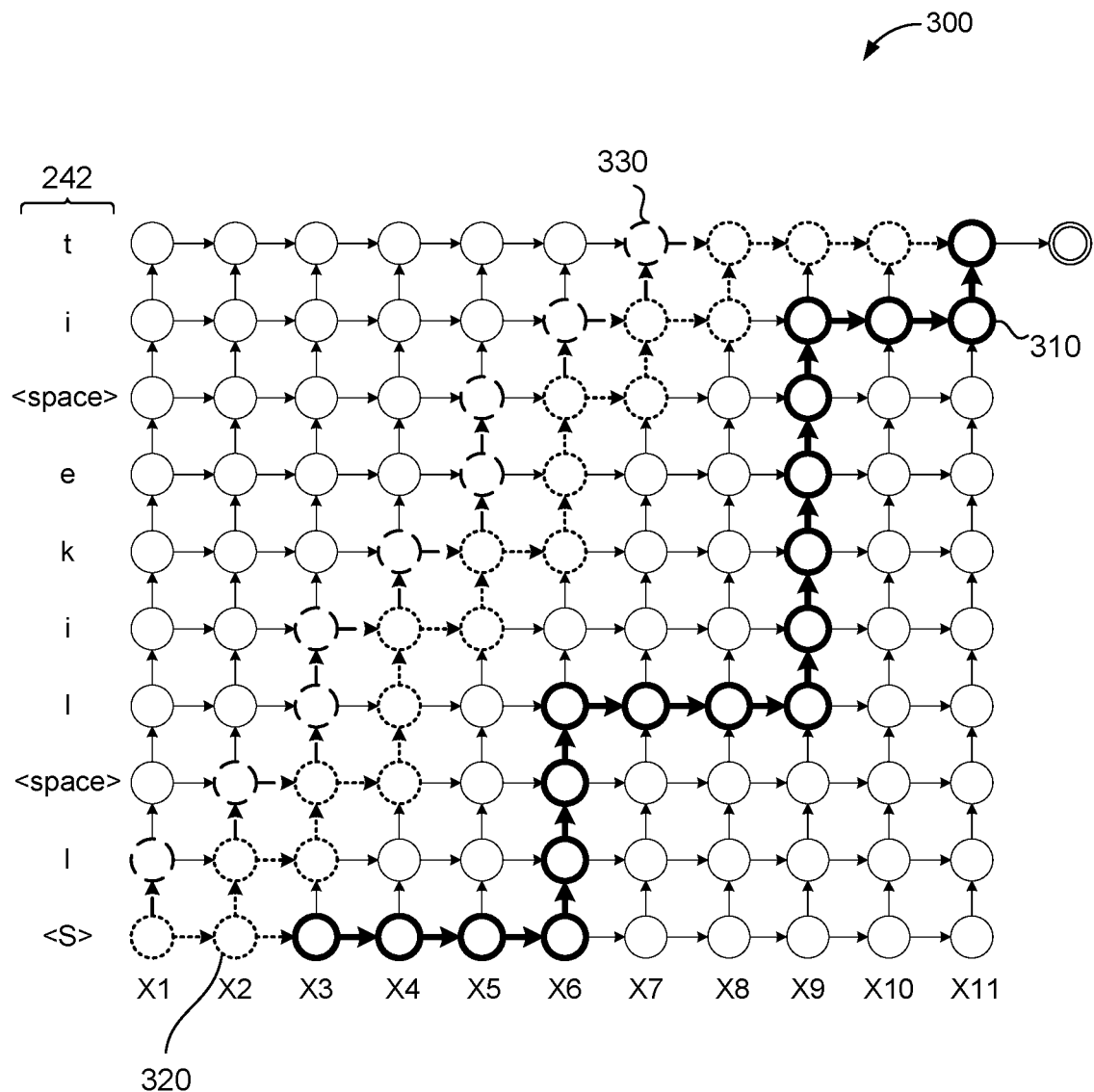
FIG. 3 is a plot of an example decoding graph depicting a self-alignment path and a forced-alignment path

FIG. 3 shows a plot of a decoding graph 300 for the transducer model 200 having the T-T model architecture for an output sequence of label tokens 242 (FIG. 2), "I like it". The x-axis denotes a respective acoustic frame at each time step and the y-axis denotes the output label tokens 242 (FIG. 2). The non-bolded solid circles and arrows represent tokens that are not included in any alignment path described below. A constrained alignment path 310 (e.g., denoted by bold circles and bold arrows as shown in FIG. 3) includes a word boundary threshold equal to two. A forced-alignment path 320 (e.g., denoted by dotted circles and dotted arrows as shown in FIG. 3) (also referred to as a reference force-alignment path 320) learned from trained transducer model 200 and a left alignment path 330 (e.g., denoted by dashed circles) includes one frame left to every frame of the forced-alignment path 320. During training of the transducer model 200, for each training batch, self-alignment encourages the left alignment path 330 (e.g., denoted by dashed circles and dashed arrows as shown in FIG. 3) by constantly pushing the model's forced-alignment path 320 to the left direction. A training loss may be represented as follows.

$$\mathcal{L}_{total} = -\log Pr(y \mid x) - \lambda \sum_u \log Pr(y_u \mid t_u, u) \quad (5)$$

where $\lambda$ is a weighting factor for the left-alignment likelihoods, $t_u$ is a frame index for the left alignment at the $u^{th}$ label/token.

Figure 4:
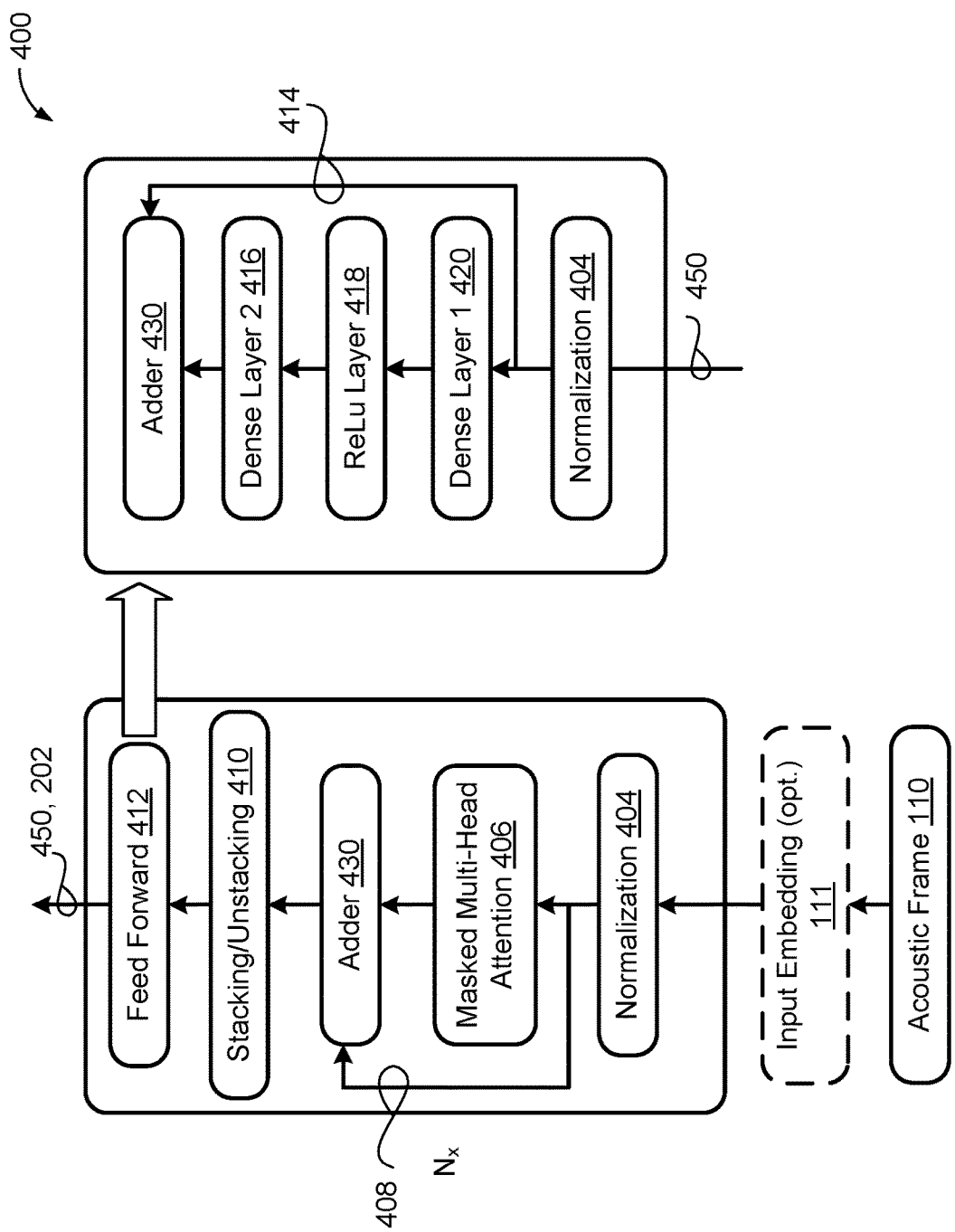
FIG. 4 is a schematic view of an example transformer architecture.

FIG. 4 shows an example transformer layer 400 among the plurality of transformer layers of the audio encoder 210. Here, during each time step, the initial transformer layer 400 receives a corresponding acoustic frame 110 as input and generates a corresponding output representation/embedding 450 received as input by the next transformer layer 400. That is, each transformer layer 400 subsequent the initial transformer layer 400 may receive an input embedding 450 that corresponds to the output representation/embedding generated as output by the immediately preceding transformer layer 400. The final transformer layer 400 (e.g., the last transformer layer in the final stack 320) generates, at each of the plurality of time steps, the higher order feature representation 202 (e.g., as denoted by $ah_t$ in reference to FIG. 2) for the corresponding acoustic frame 110.

The input to the label encoder 220 (FIG. 2) may include a vector (e.g., a one-hot vector) indicating the sequence of non-blank symbols output by a final Softmax layer 240 so far, $y_0, \ldots, y_{ui-1}$. Accordingly, when the label encoder 220 includes transformer layers, the initial transformer layer may receive an input embedding 111 by passing the the one-hot vector through a look-up table.

Each transformer layer 400 of the audio encoder 210 includes a normalization layer 404, a masked multi-head attention layer 406 with relative position encoding, residual connections 408, a stacking/unstacking layer 410, and a feedforward layer 412. The masked multi-head attention layer 406 with relative position encoding provides a flexible way to control the amount (i.e., duration) of look ahead audio context that the T-T model 200 uses. Specifically, after the normalization layer 404 normalizes the acoustic frame 110 and/or input embedding 111, the masked multi-head attention layer 406 projects the input to a value for all the heads. Thereafter, the masked multi-head layer 406 may mask an attention score to the left of the current acoustic frame 110 to produce an output conditioned only on the previous acoustic frames 110. Then, weight-averaged values for all the heads are concatenated and passed to a dense layer 2 416, where a residual connection 414 is added to the normalized input and the output of the dense layer 416 to form the final output of the multi-head attention layer 406 with relative position encoding. The residual connections 408 are added to the output of the normalization layer 404, by an adder 430, and are provided as inputs to a respective one of the masked multi-head attention layer 406 or the feedforward layer 412. The stacking/unstacking layer 410 can be used to change a frame rate for each transformer layer 400 to speed up training and inference.

The feedforward layer 412 applies normalization layer 404, followed by dense layer 1 420, rectified linear layer (ReLu) 418, and dense layer 2 416. The ReLu 418 is used as the activation on the output of dense layer 1 420. Like in the multi-head attention layer 406 with relative position encoding, a residual connection 414 of the output from the normalized layer 404 is added to the output of the dense layer 2 416 by the adder 430.

Figure 5:
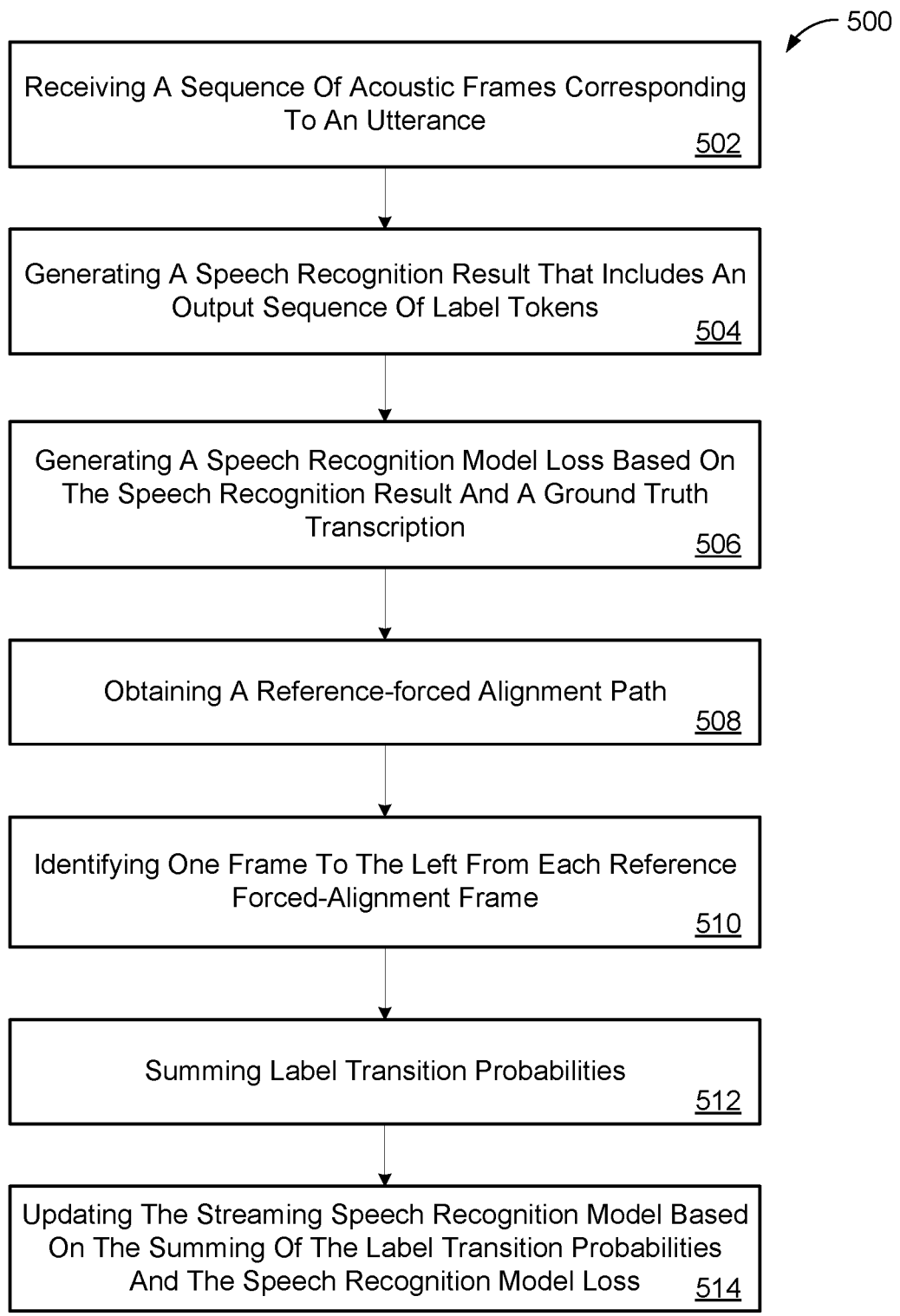
FIG. 5 is a flowchart of an example arrangement of operations for a method of reducing streaming ASR model delay with self-alignment.

FIG. 5 includes a flowchart of an example arrangement of operations for a method 500 of training a streaming speech recognition model using self-alignment to reduce prediction delay. At operation 502, the method includes receiving, as input to the streaming speech recognition model (e.g., transducer model) 200, a sequence of acoustic frames 110 corresponding to an utterance 106. The streaming speech recognition model 200 is configured to learn an alignment probability 232 between the sequence of acoustic frames 110 and an output sequence of label tokens 242. At operation 504, the method 500 includes generating, as output from the streaming speech recognition model 200, a speech recognition result 120 for the utterance 106 that includes the output sequence of label tokens 242 using the decoding graph 300. At operation 506, the method 500 includes generating a speech recognition model loss based on the speech recognition result 120 and a ground-truth transcription of the utterance 106.

At operation 508, the method 500 includes obtaining a reference-forced alignment path 320 from the decoding graph 300. At operation 510, the method 500 includes identifying one frame to the left from each reference forced alignment frame in the reference-forced alignment path 320 from the decoding graph 300. At operation 512, the method 500 includes summing label transition probabilities based on the identified frames to the left from each forced alignment frame. At operation 514, the method 500 includes updating the streaming speech recognition model 200 based on the summing of the label transition probabilities and the speech recognition model loss.

Figure 6:
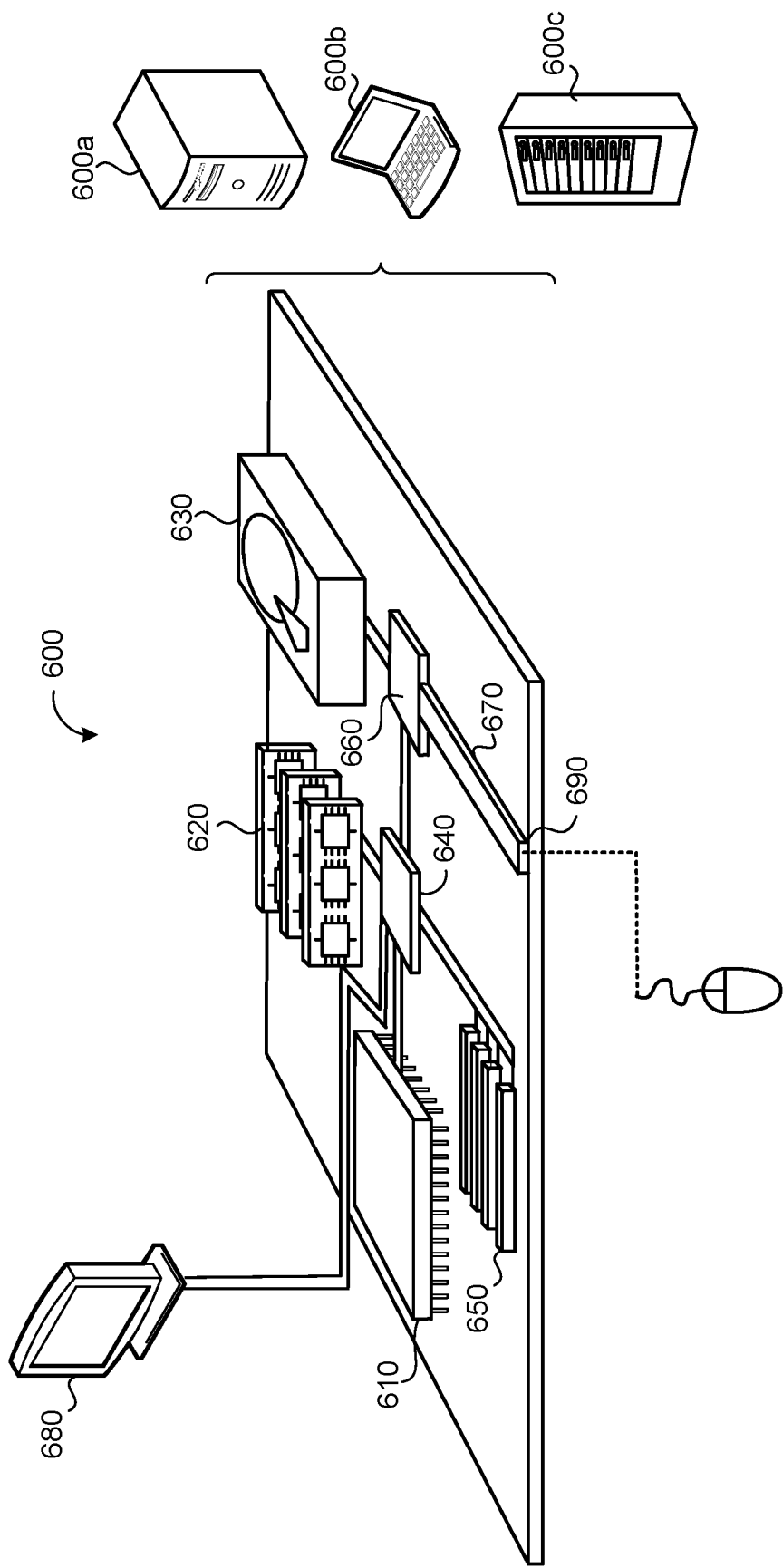
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A system comprising data processing hardware and memory hardware in communication with the data processing hardware, the memory hardware storing instructions that cause the data processing hardware to execute a streaming speech recognition model, the speech recognition model comprising:
    an audio encoder configured to:
        receive, as input, a sequence of acoustic frames characterizing an utterance; and
        generate, at each of a plurality of time steps, a higher order feature representation for a corresponding acoustic frame in the sequence of acoustic frames;
    a label encoder configured to:
        receive, as input, a sequence of non-blank symbols output by a final softmax layer; and
        generate, at each of the plurality of time steps, a dense representation; and
    a joint network configured to:
        receive, as input, the higher order feature representation generated by the audio encoder at each of the plurality of time steps and the dense representation generated by the label encoder at each of the plurality of time steps; and
        generate, at each of the plurality of time steps, a probability distribution over possible speech recognition hypotheses at the corresponding time step,
    wherein the streaming speech recognition model is trained using self alignment to reduce prediction delay by:
        obtaining, using a decoding graph, a speech recognition result for the utterance based on the probability distribution over possible speech recognition hypotheses generated by the joint network at each of the plurality of time steps;
        obtaining, from the decoding graph, a reference-forced alignment path comprising reference forced-alignment frames;
        identifying, from the decoding graph, one frame to the left from each reference forced-alignment frame in the reference-forced alignment path;
        summing label transition probabilities based on the identified frames to the left from each forced-alignment frame in the reference-forced alignment path; and
        updating the streaming speech recognition model based on the summing of the label transition probabilities.

2. The system of claim 1, wherein the streaming speech recognition model comprises a Transformer-Transducer model.

3. The system of claim 2, wherein the audio encoder comprises a stack of transformer layers, each transformer layer comprising:
    a normalization layer;
    a masked multi-head attention layer with relative position encoding;
    residual connections;
    a stacking/unstacking layer; and
    a feedforward layer.

4. The system of claim 3, wherein the stacking/unstacking layer is configured to change a frame rate of the corresponding transformer layer to adjust processing time by the Transformer-Transducer model during training and inference.

5. The system of claim 2, wherein the label encoder comprises a stack of transformer layers, each transformer layer comprising:
    a normalization layer;
    a masked multi-head attention layer with relative position encoding;
    residual connections;
    a stacking/unstacking layer; and
    a feedforward layer.

6. The system of claim 1, wherein the label encoder comprises a bigram embedding lookup decoder model.

7. The system of claim 1, wherein the streaming speech recognition model comprises one of:
    a recurrent neural-transducer (RNN-T) model;
    a Transformer-Transducer model;
    a Convolutional Network-Transducer (ConvNet-Transducer) model; or
    a Conformer-Transducer model.

8. The system of claim 1, wherein training the streaming speech recognition model using self alignment to reduce prediction delay comprises using self alignment without using any external aligner model to constrain alignment of F.

9. The system of claim 1, wherein the streaming speech recognition model executes on a user device or a server.

10. The system of claim 1, wherein each acoustic frame in the sequence of acoustic frames comprises a dimensional feature vector.

11. A computer-implemented method when executed on data processing hardware causes the data processing hardware to perform operations for training a streaming speech recognition model using self alignment to reduce prediction delay, the operations comprising:
    receiving, as input to the streaming speech recognition model, a sequence of acoustic frames corresponding to an utterance, the streaming speech recognition model configured to learn an alignment probability between the sequence of acoustic frames and an output sequence of label tokens;
    generating, as output from the streaming speech recognition model, using a decoding graph, a speech recognition result for the utterance, the speech recognition result comprising the output sequence of label tokens;

generating a speech recognition model loss based on the speech recognition result and a ground-truth transcription of the utterance;

obtaining, from the decoding graph, a reference-forced alignment path comprising reference forced-alignment frames;

identifying, from the decoding graph, one frame to the left from each reference forced-alignment frame in the reference-forced alignment path;

summing label transition probabilities based on the identified frames to the left from each forced-alignment frame in the reference-forced alignment path; and updating the streaming speech recognition model based on the summing of the label transition probabilities and the speech recognition model loss.

12. The computer-implemented method of claim 11, wherein the operations further comprise:

generating, by an audio encoder of the streaming speech recognition model, at each of a plurality of time steps, a higher order feature representation for a corresponding acoustic frame in the sequence of acoustic frames;

receiving, as input to a label encoder of the streaming speech recognition model, a sequence of non-blank symbols output by a final softmax layer;

generating, by the label encoder, at each of the plurality of time steps, a dense representation;

receiving, as input to a joint network of the streaming speech recognition model, the higher order feature representation generated by the audio encoder at each of the plurality of time steps and the dense representation generated by the label encoder at each of the plurality of time steps; and generating, by the joint network, at each of the plurality of time steps, a probability distribution over possible speech recognition hypotheses at the corresponding time step.

13. The computer-implemented method of claim 12, wherein the label encoder comprises a stack of transformer layers, each transformer layer comprising:

a normalization layer;
a masked multi-head attention layer with relative position encoding;
residual connections;
a stacking/unstacking layer; and
a feedforward layer.

14. The computer-implemented method of claim 12, wherein the label encoder comprises a bigram embedding lookup decoder model.

15. The computer-implemented method of claim 12, wherein the streaming speech recognition model comprises a Transformer-Transducer model.

16. The computer-implemented method of claim 15, wherein the audio encoder comprises a stack of transformer layers, each transformer layer comprising:

a normalization layer;
a masked multi-head attention layer with relative position encoding;
residual connections;
a stacking/unstacking layer; and
a feedforward layer.

17. The computer-implemented method of claim 16, wherein the stacking/unstacking layer is configured to change a frame rate of the corresponding transformer layer to adjust processing time by the Transformer-Transducer model during training and inference.

18. The computer-implemented method of claim 11, wherein the streaming speech recognition model comprises one of:

a recurrent neural-transducer (RNN-T) model;
a Transformer-Transducer model;
a Convolutional Network-Transducer (ConvNet-Transducer) model; or
a Conformer-Transducer model.

19. The computer-implemented method of claim 11, wherein the streaming speech recognition model executes on a user device or a server.

20. The computer-implemented method of claim 11, wherein the operations further comprise training the streaming speech recognition model using self alignment to reduce prediction delay without using any external aligner model to constrain alignment of the decoding graph.

* * * * *